Feb. 13, 1945.   C. S. ASH   2,369,202
AUTOMOTIVE VEHICLE WHEEL
Filed Nov. 26, 1942   5 Sheets-Sheet 1
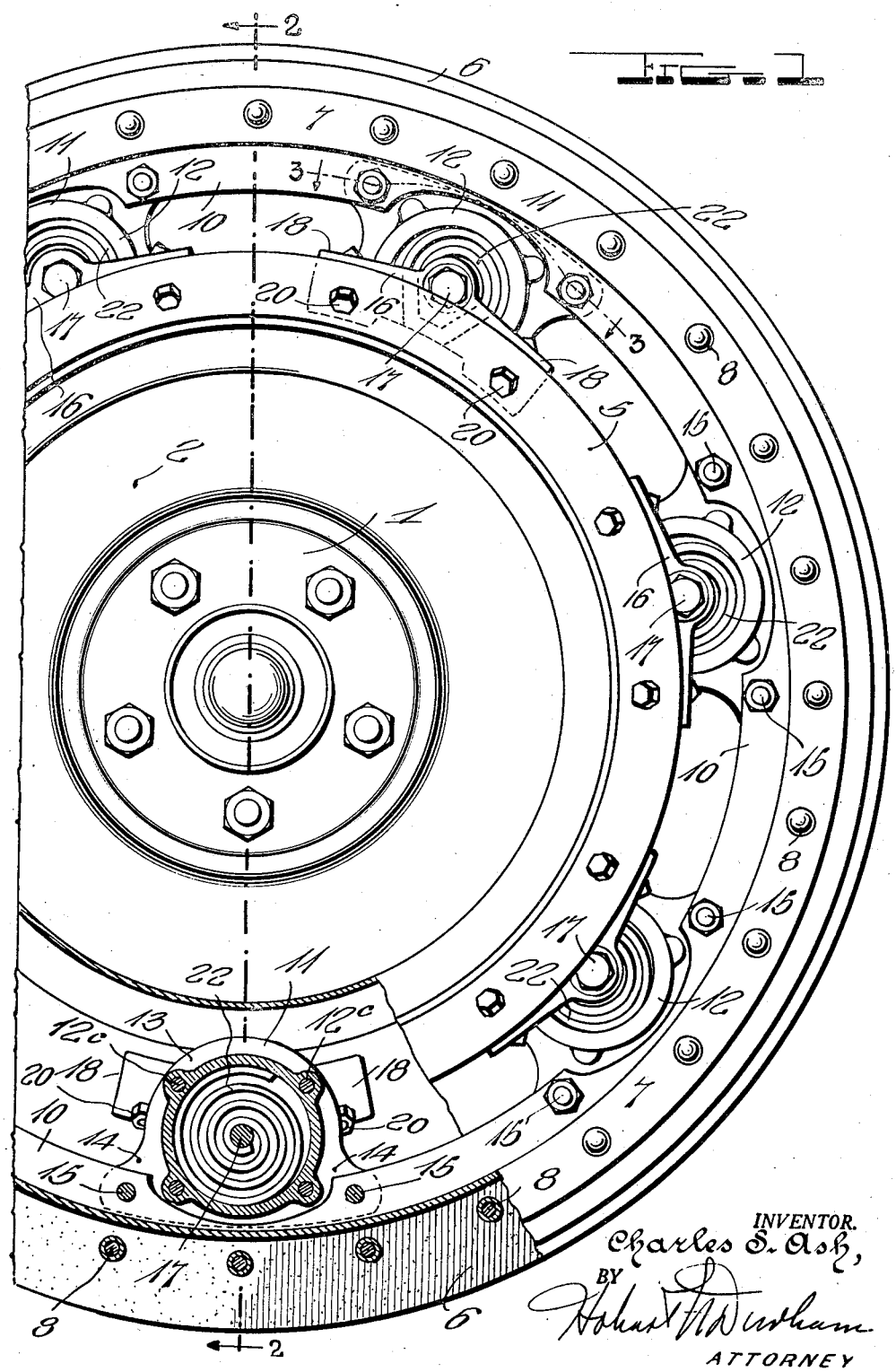
INVENTOR.
Charles S. Ash,
BY
ATTORNEY

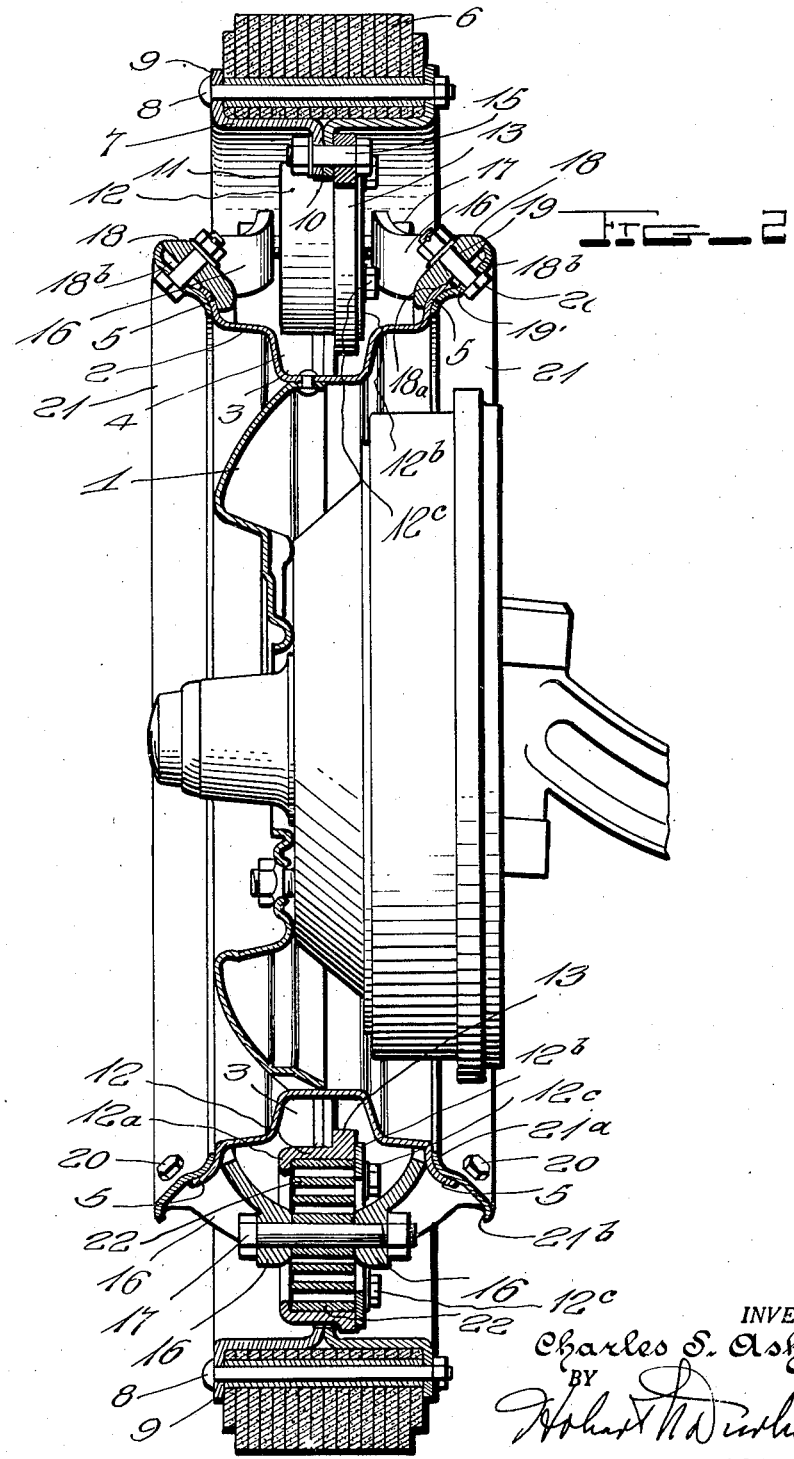

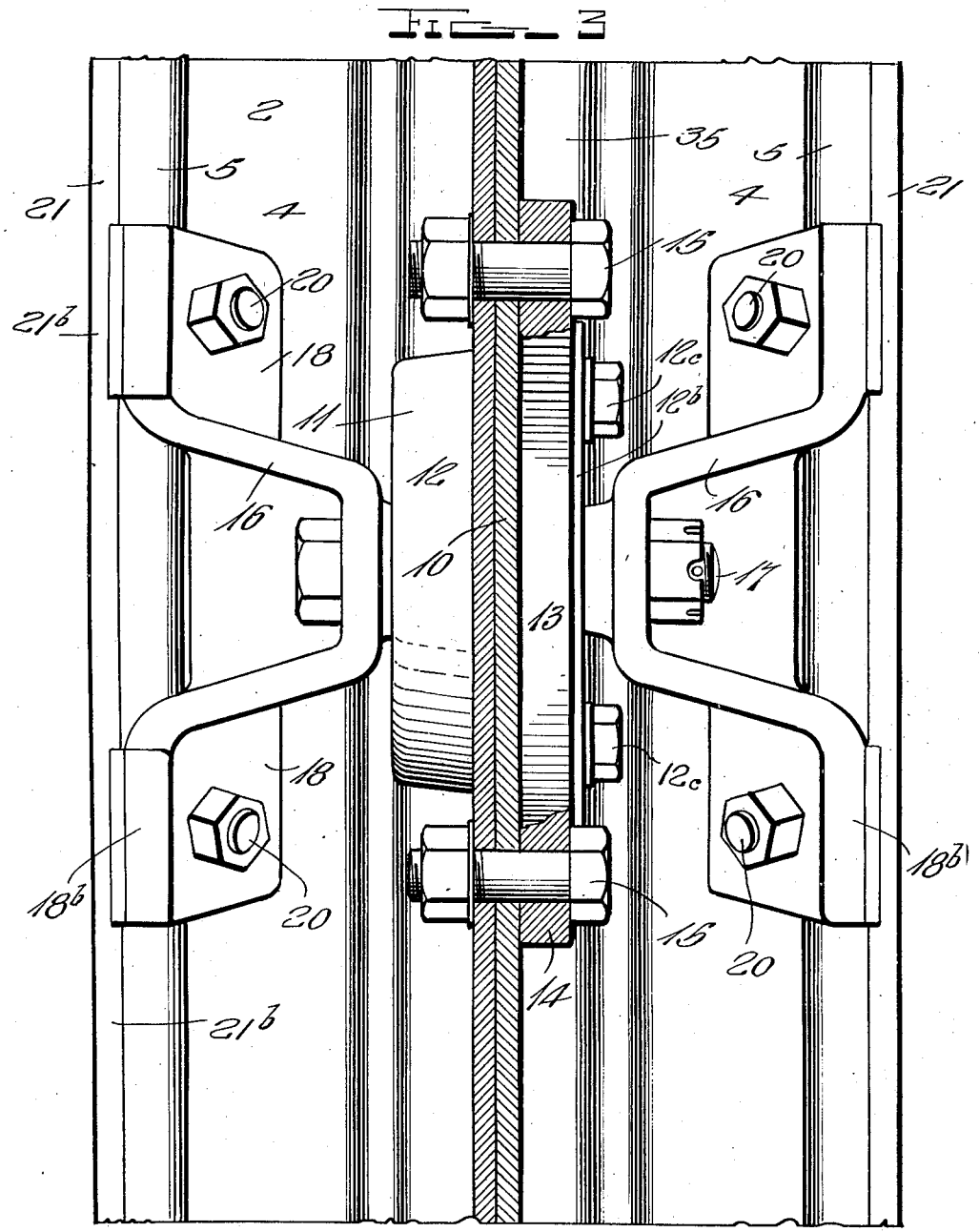

Feb. 13, 1945.   C. S. ASH   2,369,202
AUTOMOTIVE VEHICLE WHEEL
Filed Nov. 26, 1942   5 Sheets-Sheet 4
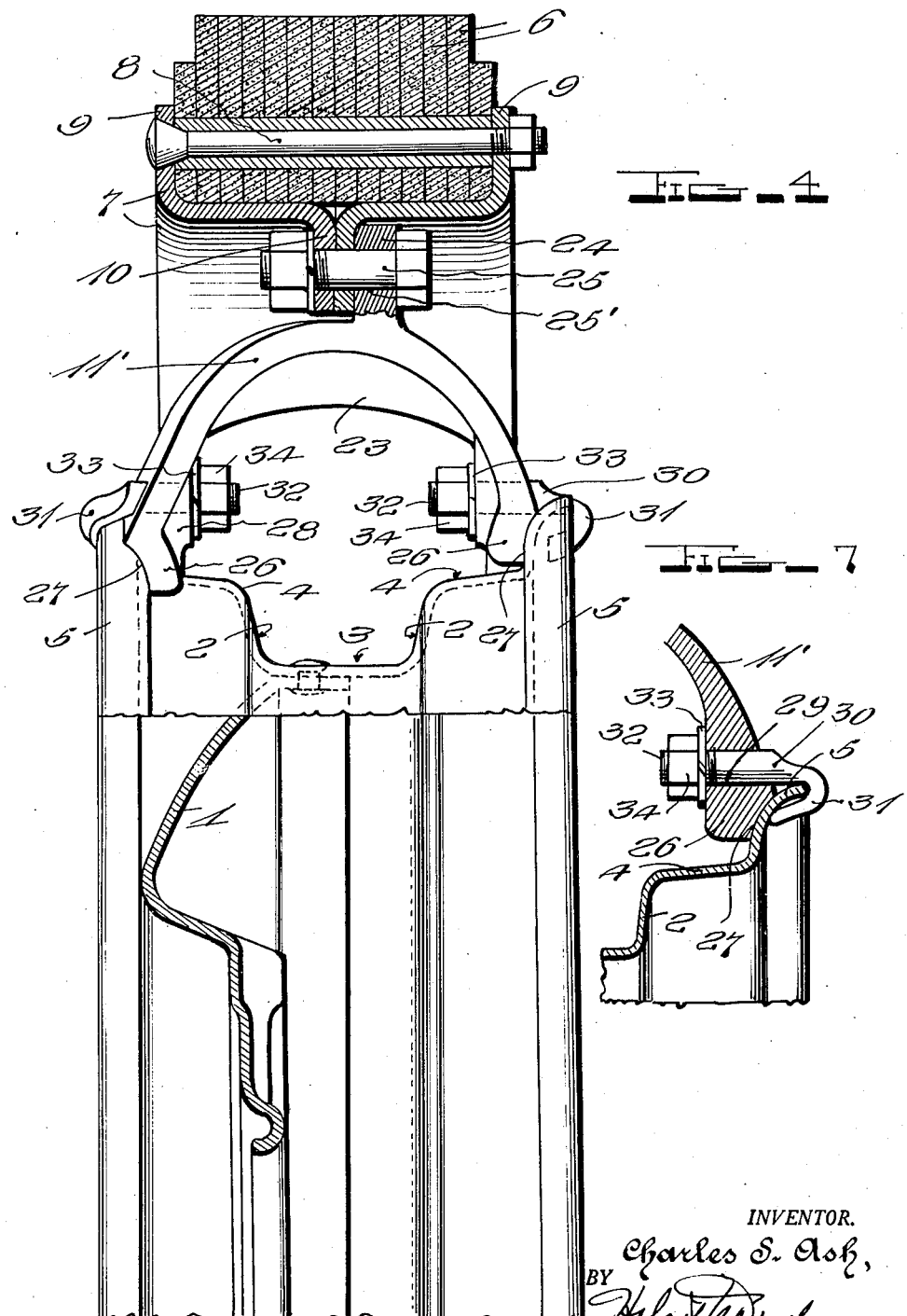
INVENTOR.
Charles S. Ash,
BY
ATTORNEY Feb. 13, 1945.  C. S. ASH  2,369,202
AUTOMOTIVE VEHICLE WHEEL
Filed Nov. 26, 1942   5 Sheets-Sheet 5
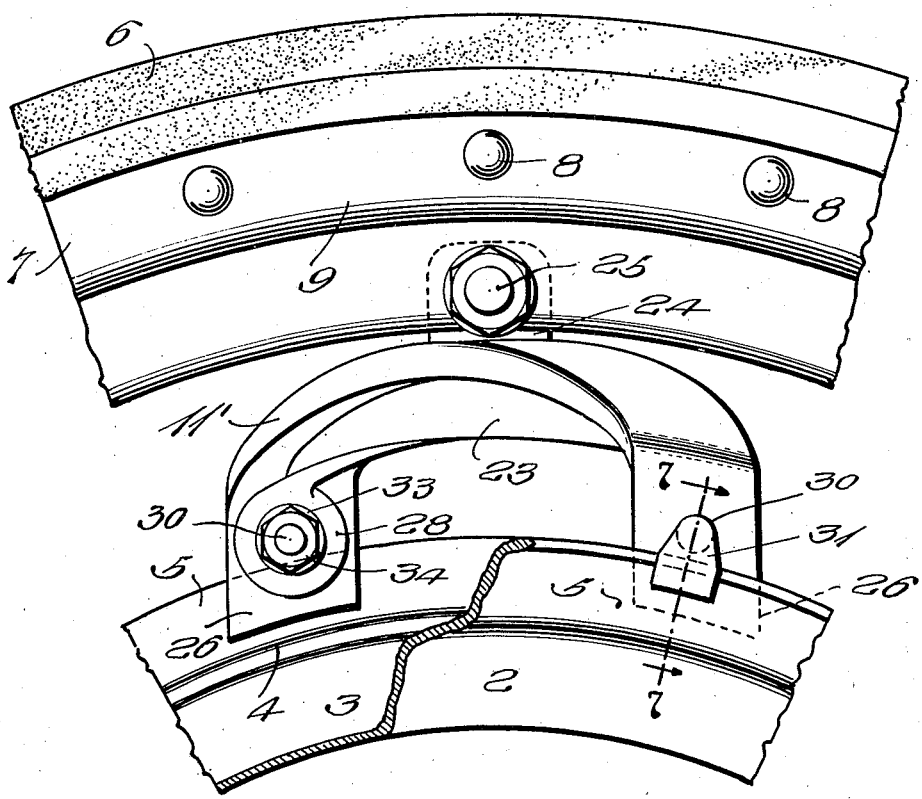
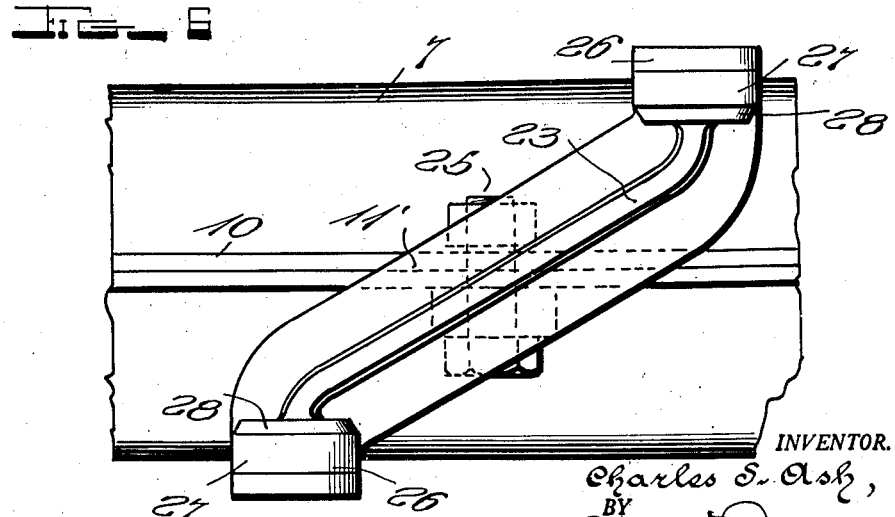
INVENTOR.
Charles S. Ash,
BY
ATTORNEY Patented Feb. 13, 1945

2,369,202

UNITED STATES PATENT OFFICE 2,369,202

AUTOMOTIVE VEHICLE WHEEL

Charles S. Ash, Milford, Mich.

Application November 26, 1942, Serial No. 466,979

9 Claims. (Cl. 152—95)

This invention relates to vehicle wheels, and particularly to wheels of that type comprising a wheel body, a tire carrying rim, and connecting devices or units arranged between and detachably connecting the rim with the wheel body.

The invention further relates to a wheel of this character in which the connecting devices or units are in the form of springs serving to movably mount and to cushion the movements of the rim in the running of the wheel.

One object of the invention is to provide a novel construction of the carrying rim and connecting devices or units whereby a tire carrying rim equipped with a non-pneumatic tire may be applied to a standard pneumatic tire carrying rim to temporarily or permanently take the place of a pneumatic tire ordinarily mounted thereon.

Another object of the invention is to provide connecting devices or units which will allow of the ready and convenient detachable connection of a properly sized tire carrying rim of the character described with the flanges of a given-sized standard pneumatic tire carrying rim.

Still another object of the invention is to provide connecting devices or units in the form of cushioning or shock absorbing elements which will allow of the use of a suitable rim and tire other than a pneumatic tire for effectually cushioning the wheel.

Still another object of the invention is to provide cushioning units for resiliently supporting a non-pneumatic type of tire and its carrier rim, and which may be used in connection with a conventional type of wheel and pneumatic tire carrying rim to secure satisfactory cushioning actions while allowing the pneumatic tire to be dispensed with.

Still another object of the invention is to provide a spiral spring cushioned tire which may be mounted on a standard wheel to take the place of a pneumatic tire, and which may be secured to the standard rim flanges.

Still another object of the invention is to provide a spiral spring cushioned tire structure embodying spiral spring members which are so constructed and mounted as to be highly flexible and durable and free from localized flexing points liable to cause crystallization of the spring metal, and which will efficiently take care of radial, torsional and other strains.

Still another object of the invention is to provide spiral spring cushioning units including housing and attaching means for readily mounting the springs between and securing the same to the wheel body, or conventional tire carrying rim, and to a rim carrying a substitute tire, and whereby the springs will be suitably enclosed and protected from injury and sustained against displacing strains.

Still another object of the invention is to provide a spiral spring cushioned tire structure of the character described which may be readily and economically manufactured and easily applied for use to a wheel, which is adapted to be readily and conveniently repaired when necessary, and which will allow satisfactory lubrication of the springs for securing maximum freedom of motion thereof in their cushioning actions.

With these and other objects in view, which will appear in the course of the subjoined description, the invention consists in the novel features of construction, combination and arrangement of parts, hereinafter more fully described and claimed, and as shown in the accompanying drawings, in which:

Fig. 1 is a view in side elevation, showing portion of a wheel embodying a preferred form of the invention.

Fig. 2 is a vertical transverse section through the wheel taken on the line 2—2 of Fig. 1.

Fig. 3 is a sectional view on an enlarged scale taken on the line 3—3 of Fig. 1.

Fig. 4 is a view similar to Fig. 2, showing a modified form of connecting devices or units for connecting the tire carrying rim with the wheel body.

Fig. 5 is a view partly in side elevation and partly in longitudinal section of portions of the tire carrying rim and wheel body shown in Fig. 4, and one of the connecting units.

Fig. 6 is a view of a portion of the tire carrying rim and one of the connecting units looking toward the inner faces thereof.

Fig. 7 is a detail section on line 7—7 of Fig. 5.

Referring now more particularly to Figs. 1 to 3, inclusive, of the drawings, 1 designates a wheel body of suitable type, that shown being of disk type and including a channeled rim 2, such as a rim of conventional type for supporting a pneumatic tire, said rim having a depressed central portion 3, side seat surfaces 4 and outturned flanges 5. This rim may be a standard 16 x 4.00 rim or any generally similar rim designed normally to support a pneumatic tire of any standard size.

The invention provides for the use, in place of a pneumatic tire, of a non-pneumatic tire or tread 6 carried by a channeled rim 7 surrounding the rim 2 and connected therewith by a novel construction of resilient cushioning means. The tire or tread 6 may consist of a band of any suitable strong and durable material or fabricated structure which is seated in the rim 7 and suitably secured therein, as by means of retaining bolts 8. The rim 7 is preferably one of circumferentially divided type comprising similar half sections having outwardly extending tire holding flanges 9 at their outer edges and having at their inner or abutting edges inwardly extending flanges 10.

The cushioning means comprises an annular series of connecting and cushioning spring devices or units 11 arranged at regular intervals about the rim 2 and between said rim and the tire holding or tread rim 7. Each of these cushioning units consists of a casing or housing 12 of cylindrical or other suitable form and cylindrical internal form and having flat sides parallel with each other and provided with guide openings. In the present instance the housing is shown as being fully open at one side except for a shallow inwardly extending retaining flange 12a defining a guide opening and fully open at its opposite side, but partly closed in service by a cover plate 12b having a guide opening therein and fastened in place by machine screws 12c. This casing or housing is provided with a circumferential flange 13 which at its outer portion is extended to lap the outer side of one of the flanges 10 and is formed with attaching ears 14, which ears and the flanges 10 are apertured for the passage of bolts 15 whereby the rim 7 and the housing 12 are rigidly but detachably united.

The housing 12 may depend at its base or inner portion partly within the channeled depression 3, to such an extent as to adapt the parts to be compactly disposed while allowing the housing to have a desired range of inward and outward cushioning movements in the channel of the rim 2. Arranged at the sides of the housing and extending longitudinally of the rim 2 are U-shaped brackets 16, the central body portions of which are formed with guide bosses projecting respectively into the guide openings formed in the flanged side and cover plate of the housing body, and which portions of the brackets are apertured for the passage of a bolt or connecting element 17 which extends through the chamber of the housing and the said guide openings, whereby the housing is guidedly mounted on the brackets for cushioning movements radially of the wheel. The brackets have end portions 18 inclined at an angle to their body portions and formed with curved clamping faces 18a to bear upon the rim flanges 5, clamping faces 18b projecting outwardly beyond the faces 18a and beyond the free edges of the rim flanges 5, and bolt holes 19 between said clamping faces. Bolts 20 are passed through the holes 19 and through like holes 19' in clamping rings 21 extending externally around the flanges 5 at the sides of the rim 2. These rims are formed with curved inner clamping portions 21a to underlie and clamp the rim flanges 5 against the clamping faces 18a of the brackets and with outer clamping flanges 21b to engage the clamping faces 18b of the brackets. The bolts draw the brackets and rings in tight clamping engagement with the rim flanges to rigidly hold the brackets in position. The rings serve not only as clamping members but also as stiffening members to reinforce the rim 2 in an obvious manner.

The above described mode of mounting the units permits of the ready and convenient mounting of the units 11 and the rim 7 and tire 6 on the wheel rim 2, as well as the removal of a section of the rim 7 for the removal of a worn tire and substitution of a new one, and the dismounting and remounting of any of the parts of the cushioning units for renewal or repairs. This mode of mounting the units also provides for free inward and outward movements of the housings and tread rim 7 on and relative to the connecting elements 17 of the housing fastening means or brackets 16 for the use of resilient cushioning elements to properly cushion the wheel in its running travel. The cushioning elements employed for this purpose consist of flat spiral springs 22, of a strong and durable spring steel, arranged one in each unit housing 12. As stated, each housing has a cylindrical inner wall surface, and the spring 22 is enclosed in the chamber of this housing with its inner convolution coiled about the connecting member 17 and its outer convolution bearing on the cylindrical wall of the chamber. These springs may be of a width equal to the width of the housing chamber and are held from lateral shifting or displacement by the flange 12a and cover plate 12b at the sides of the housing. By detachment of the cover plate 12b and the bracket 16 at the same side of the housing access to the spring for repairs, replacement or other servicing may be readily obtained. The springs of the units operate alike to resiliently support and cushion the movements of the rim 7 and tire 6 and to efficiently handle the various strains, lateral, radial and torsional, falling thereon in the running of the wheel. An important feature in the mounting of each spring is that the spring is not confined in any way to produce a localized flexing point causing crystallization of its metal. A high degree of flexibility and durability of the springs is thus secured. Suitable means to pack the housing with a lubricant may be employed, if desired.

It will be observed that the parts used in the wheel structure above described are wholly or practically duplicates, and that, with the exception of the resilient units, they may be of conventional types in use. Also it will be observed that the resilient units are alike in construction. Hence the structure is such as to insure economy of manufacture, ease and rapidity of assemblage, and convenience in obtaining supply parts and making repairs. In practice, the wheel body structure may be of a standard type employed for supporting a pneumatic tire and the remaining elements may be made of standardized or readily procurable or manufactured parts, so that the usual pneumatic tire may be dispensed with and the substitute features applied in its place on the wheel body structure. This avoids the necessity of providing a special wheel body structure for the purpose and allows a conventional type of body structure to be used in the production of new spring cushioned wheels or in converting a pneumatic tired wheel into a spring cushioned wheel. The general advantages of the structure, in addition to those stated, are that the tread element can be removed and replaced by separating the split-type rim and without disturbing other parts, that the spiral spring of any unit may be removed or serviced without dismantling the complete assembly, that the spring cushioned tire structure as a whole is mounted on a standard wheel body or flanged rim, that no material amount of machine work is necessary in building the cushioned tire structure, as the structure may be produced by assembling ready made conventional or easily made parts, and that the clamping rings which clamp under the rim flanges serve to support and reinforce the rim flanges as well as to properly space and locate the supporting brackets.

In Figs. 4 to 7, inclusive, a modified form of the invention is shown in which connecting devices or units 11' of different type from the units 11, but having certain similar characteristics, are employed to connect the tire carrying rim with the rim flanges of the standard rim part or channeled outer peripheral portion 2 of the rim body. The connecting devices or units 11' here shown are in the form of arched or bowed metallic brackets arranged at intervals about the wheel body to span or bridge the space between the rim flanges 5 and having their concaved sides facing inwardly or toward the rim 2 and their convex sides facing outwardly or toward the rim 7. These brackets are preferably arranged at a diagonal angle to the rims for connection with the respective flanges 5 at spaced points circumferentially of the rim 2 to extend their supporting areas and adapt them to more effectually brace the rims and withstand the various service strains falling thereon. Each bracket 11' may be rigid or substantially so against spreading movements of its legs and is preferably provided on the interior of its arched portion with a stiffening web 23 to sustain it against spreading or twisting strains. The convex sides of the brackets are provided with flanges or lugs 24 which are lapped by the flanges 10 of the rim 7, and bolts 25 passing through the flanges 10 and 24 detachably secure said rim to the brackets and the sections of the rim 7 to each other. The free ends of the legs of the brackets terminate in clamping portions or lugs 26 having concaved clamping faces 27 to bear upon the inner faces of the rim flanges 5, and adjacent to these lugs the bracket legs are provided on their inner sides with bosses 28 having flat bearing faces. Openings 29 are formed in the legs of each bracket and extend through the bosses, said openings being provided for passage of clamping bolts 30 having hooked ends 31 and threaded ends 32. The hooked ends 31 are adapted for clamping engagement with the outer faces of the rim flanges 5 and the threaded ends 32 receive washers 33 and nuts 34 for clamping engagement with the flat faces of the bosses 28, whereby the bracket legs are detachably clamped to the rim flanges. This construction adapts the brackets 11' to be quickly applied to or removed from the rim 2 as occasion requires and ensures the firm holding of the applied brackets in position. Such construction also provides for the ready attachment of the rim 7 and tire carried thereby to the brackets and ready removal of said rim and tire as a unit when desired, or the removal of one section of the rim 7 for application or removal of a tire.

The structure shown in Figs. 1 to 7, inclusive, may be employed for the mounting of a non-pneumatic tire and tire carrying rim on the standard pneumatic tire carrying rim of a wheel body, to take the place of a pneumatic tire when a tire of the latter-named type is not available. The use of a tire carrying rim and brackets or connecting units of the character disclosed allows this to be readily done. While this structure is not designed to afford resiliency to absorb shocks like a pneumatic tire when a vehicle is running at high speeds, it will enable a wheel to be used in an emergency, as the substitute tire employed may be designed to sufficiently absorb shocks when the vehicle is run at comparatively slow speeds and up to, for example, 35 miles an hour. Such a non-pneumatic tire structure may be used, for instance, on a spare wheel of a vehicle whose running wheels are equipped with pneumatic tires, so that in the event of injury to a pneumatic tire the spare wheel with its non-pneumatic tire may be used until the pneumatic tire is repaired. In case of an absolute emergency, however, as in the absence of any pneumatic tires, the running wheels may be equipped with the non-pneumatic features to allow the vehicle to be used at reasonable and safe running speeds.

Having thus described my invention, I claim:

1. In a spring cushioned wheel, a wheel body, a tire carrying rim, and an annular series of spring cushioning units arranged at spaced intervals about the body and between the body and the rim and each comprising a casing secured to the tire carrying rim, bracket members secured to the wheel body, a bolt passing through the casing and connected with the bracket members, and a spiral cushioning spring disposed in the casing and between the same and said bolt.

2. In a spring cushioned wheel, a wheel body, a tire carrying rim, and an annular series of spring cushioning units arranged at spaced intervals about the body and between the body and the rim and each comprising a casing secured to the tire carrying rim, bracket members secured to the wheel body, a connecting member between the brackets passing through the casing but free from connection therewith, and a spiral cushioning spring disposed within the casing and having engagement therewith and with the connecting member.

3. In a spring cushioned wheel, a wheel body, a tire carrying rim, and an annular series of spring cushioning units arranged at spaced intervals about the body and between the same and the rim and each comprising a casing having apertured sides and an internal annular wall, bracket members disposed on opposite sides of the casing and secured to the wheel body, a connecting member extending between the brackets and through the apertured walls of the casing, and a spiral cushioning spring disposed in the casing between the connecting member and the annular wall of the casing.

4. In a spring cushioned wheel, a wheel body element, a tire carrying rim element, and an annular series of spring cushioning units arranged at spaced intervals about the body and between the same and the rim and each comprising a casing secured to one of said elements, a pair of bracket members disposed at one side of said casing and secured to the other of said elements, a connecting member extending between the bracket elements and through the casing, the casing having freedom of movement relative to said connecting element, and a spiral cushioning spring disposed in the casing about the connecting element and between the same and the casing.

5. In a spring cushioned wheel, a wheel body element, a tire carrying element, and an annular series of cushioning units arranged at spaced intervals about the body and between the same and the rim and each comprising a casing secured to one of said elements and having openings at its sides and an internal annular wall, a pair of bracket members disposed on opposite sides of the casing and secured to the other of said elements, a connecting member between the brackets passing through the casing and the openings in its side walls and free from connection with the casing to allow floating movement thereof, said casing having an internal annular abutment wall, and a spiral cushioning spring disposed in the casing about the connecting member with its inner and outer convolutions respectively in engagement with the connecting member and the annular abutment wall.

6. In a spring cushioned wheel, a wheel body element having flange means, a tire carrying rim element having flange means, and an annular series of cushioning units arranged at spaced intervals about the body and between the same and the rim and each comprising a casing having a flange secured to the flange means of one of said elements, a pair of bracket members disposed on opposite sides of the casing and secured to the flange means of the other element, a bolt passing through the casing and connected with the bracket members, and a spiral cushioning spring disposed in the casing and between the same and said bolt.

7. In a spring cushioned wheel, a wheel body having a channeled rim, a tire carrying rim surrounding the channeled rim in spaced relation thereto, and an annular series of cushioning units arranged between said rims and each comprising a casing secured to the tire carrying rim, a pair of bracket members disposed at opposite sides of the casing and secured to the side edges of the channeled rim, a bolt passing through the casing and connected with the bracket members, and a spiral cushioning spring disposed in the casing and between the same and said bolt.

8. In a spring cushioned wheel, a wheel body carrying a channeled rim having outturned side flanges, clamping rings at opposite sides of the channeled rim for clamping engagement with the flanges, a tire carrying rim surrounding the channeled rim in spaced relation thereto, and an annular series of cushioning units arranged at spaced intervals about the channeled rim and between the same and the tire carrying rim and each comprising a casing secured to the tire carrying rim and depending into the channeled rim, bracket members at opposite sides of the casing having portions to bearing on the outlined flanges of the channeled unit, bolts passing through the bearing portions of the bracket members and the flanges of the channeled rim and clamping them together, a connecting member extending through the casing and between the bracket members, and a spiral cushioning spring disposed in the casing and between the same and the connecting member.

9. In a spring cushioned wheel, a wheel body carrying a channeled rim having outturned side flanges and seat surfaces adjacent thereto, clamping rings at opposite sides of the channeled rim for clamping engagement with the flanges, a tire carrying rim surrounding the channeled rim in spaced relation thereto, and an annular series of cushioning units arranged at spaced intervals about the channeled rim and between the same and the tire carrying rim and each comprising a casing secured to the tire carrying rim and depending into the channeled rim, bracket members at opposite sides of the casing having portions bearing on the outturned flanges of the channeled unit, and portions bearing on the seat surfaces thereof, bolts passing through the first named bearing portions of the brackets and the flanges of the channeled rim and the clamping rings and clamping said parts together, a connecting member extending through the casing and between the bracket members, and a spiral cushioning spring disposed in the casing and between the same and the connecting member.

CHARLES S. ASH.